United States Patent
Fukuoka

(10) Patent No.: US 7,577,402 B2
(45) Date of Patent: Aug. 18, 2009

(54) RADIO COMMUNICATION SYSTEM, FIXED INFORMATION DEVICE, AND MOBILE TERMINAL DEVICE

(75) Inventor: Shinya Fukuoka, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 310 days.

(21) Appl. No.: 10/594,007

(22) PCT Filed: Feb. 25, 2005

(86) PCT No.: PCT/JP2005/003145

§ 371 (c)(1),
(2), (4) Date: Sep. 25, 2006

(87) PCT Pub. No.: WO2005/094046

PCT Pub. Date: Oct. 6, 2005

(65) Prior Publication Data

US 2007/0216530 A1  Sep. 20, 2007

(30) Foreign Application Priority Data

Mar. 29, 2004 (JP) .................... 2004-096006

(51) Int. Cl.
*H04B 7/00* (2006.01)
(52) U.S. Cl. ............... 455/41.2; 340/572.1; 340/539.1; 340/686.2; 701/117
(58) Field of Classification Search ............... 455/41.2; 340/10.1–10.6, 572.1–572.9, 539.1, 686.2
See application file for complete search history.

(56) References Cited

U.S. PATENT DOCUMENTS

| | | | |
|---|---|---|---|
| 4,857,851 A * | 8/1989 | Anderson et al. ........... 324/326 |
| 6,122,528 A | 9/2000 | Garcia et al. |
| 6,322,415 B1 * | 11/2001 | Cyrus et al. .................. 446/130 |
| 6,646,555 B1 * | 11/2003 | Forster et al. ............ 340/572.8 |
| 7,135,975 B2 * | 11/2006 | Hoshina et al. .......... 340/572.1 |
| 2002/0033757 A1 * | 3/2002 | Rodgers et al. .......... 340/572.1 |
| 2002/0146978 A1 * | 10/2002 | Basson et al. .............. 455/11.1 |
| 2004/0056778 A1 * | 3/2004 | Hilliard ...................... 340/933 |
| 2004/0155782 A1 * | 8/2004 | Letkomiller et al. ...... 340/573.3 |
| 2004/0259499 A1 * | 12/2004 | Oba et al. .................. 455/41.2 |
| 2004/0260455 A1 * | 12/2004 | Dort .......................... 701/117 |
| 2006/0007003 A1 * | 1/2006 | Yamagiwa ............... 340/572.1 |

FOREIGN PATENT DOCUMENTS

| | | |
|---|---|---|
| GB | 2358991 A | 8/2001 |
| JP | 7-192102 A | 7/1995 |
| JP | 8-278929 A | 10/1996 |
| JP | 9162959 A | 6/1997 |
| JP | 2000-038092 A | 2/2000 |

\* cited by examiner

*Primary Examiner*—Duc Nguyen
*Assistant Examiner*—Zhiyu Lu
(74) *Attorney, Agent, or Firm*—Foley & Lardner LLP

(57) ABSTRACT

A first radio communication unit of a stationary information device performs a radio communication to detect an approach of a mobile terminal device. An attracting unit of the stationary information device generates, when the approach of the mobile terminal device is detected, an attraction force for attracting and fixing the mobile terminal device. A second radio communication unit of the mobile terminal device performs the radio communication with the first radio communication unit. An attracted unit of the mobile terminal device is attracted to the attraction force generated by the stationary information device.

15 Claims, 7 Drawing Sheets

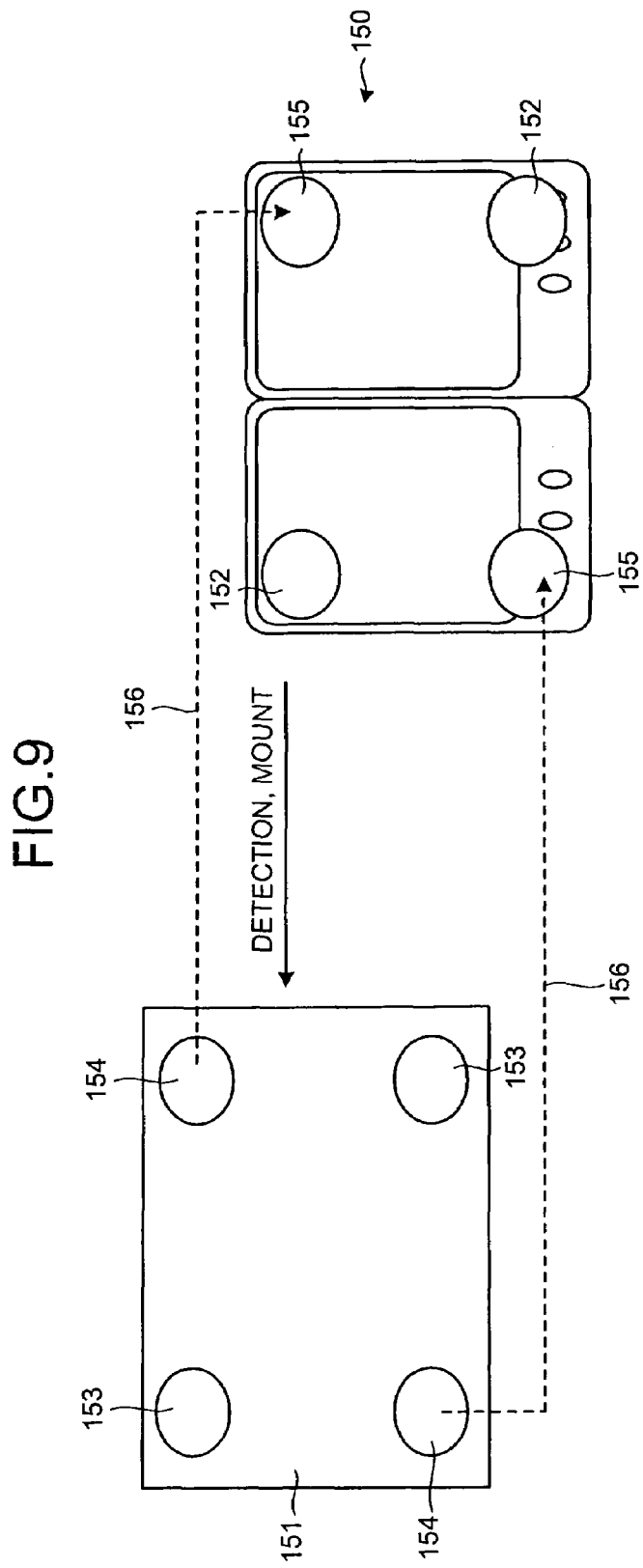

RADIO COMMUNICATION SYSTEM, FIXED INFORMATION DEVICE, AND MOBILE TERMINAL DEVICE

TECHNICAL FIELD

The present invention relates to a radio communication system that performs a radio information communication between a stationary information device and a mobile terminal device, and also to a stationary information device and a mobile terminal device that constitute such a radio communication system.

BACKGROUND ART

Conventionally, information processing devices have been widely used. In recent years, as the size of an information processing device is reduced, various information processing terminals such as a personal digital assistant (PDA) have come into practical use. A PDA is a small mobile information terminal that includes a microcomputer, a display, a pen-based function, a communication function, and the like. An information processing device of this type includes a system in which a mobile terminal device is placed near a distribution device so that a magnetic filed is generated from the distribution device and a switch on the mobile terminal is turned on by the magnetic field if the mobile terminal device is positioned close thereto, at which timing the two devices start communications (refer to Patent Document 1, for example).

[Patent Document 1] Japanese Patent Laid-Open Publication No. 8-278929

DISCLOSURE OF INVENTION

Problem to be Solved by the Invention

However, when such a mobile terminal is used, for example, by attaching it to a distribution device that is fixed inside a vehicle, it is necessary to ensure the attachment so that the terminal would not come off despite vibration created during the movement of the vehicle or the like. In conventional technology, the attachment is made in a mechanical manner, which leads to a problem of, for example, the structure and design of each device being complicated. Thus, it is preferable to adopt an attaching method other than a mechanical attachment. Furthermore, according to the aforementioned conventional technology, a technique of performing high-speed radio communications by use of mobile terminals of this type has not yet been considered, leaving much to be improved regarding a communication speed.

The present invention was conceived in light of the above. The purpose of the invention is to achieve a radio communication system capable of reliably attaching a stationary information device and a mobile terminal device to each other with a simple structure and performing radio communications at a higher speed, and a stationary information device and a mobile terminal device that constitute this radio communication system.

Means for Solving Problem

The invention according to claim 1 is a radio communication system that performs a radio communication between a stationary information device and a mobile terminal device. The stationary information device includes a first radio communication unit that performs a radio communication to detect an approach of the mobile terminal device; a detecting unit that detects the approach of the mobile terminal device based on a result of the radio communication by the first radio communication unit; and an attracting unit that generates, when the detecting unit detects the approach of the mobile terminal device, an attraction force for attracting and fixing the mobile terminal device. The mobile terminal device includes a second radio communication unit that performs a radio communication to detect an approach of the stationary information device; and an attracted unit that is attracted to the attraction force generated by the stationary information device.

The invention according to claim 7 is a stationary information device that includes a first radio communication unit that performs a radio communication to detect approach of an external device; a detecting unit that detects the approach of the external device based on a result of the radio communication by the first radio communication unit; and an attracting unit that generates, when the detecting unit detects the approach of the external device, an attraction force for attracting and fixing the external device.

The invention according to claim 13 is a mobile terminal device that includes a first radio communication unit that performs a radio communication to detect an approach of an external device; and an attracted unit that is attracted to an attraction force generated by the external device.

BRIEF DESCRIPTION OF DRAWINGS

FIG. 9 is a diagram of an example of the structures of a book-type mobile terminal device and a stationary information device.

EXPLANATIONS OF LETTERS OR NUMERALS

Figure 1:
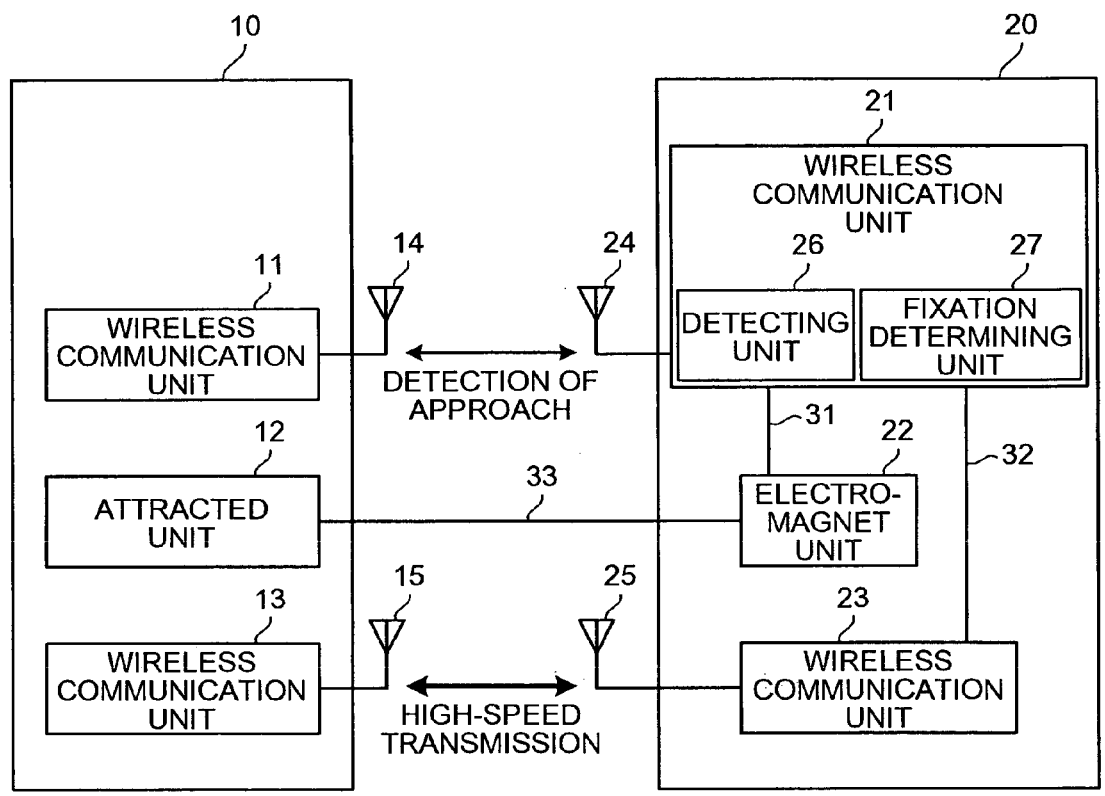
FIG. 1 is a diagram for explaining the overview of a radio communication system according to the present invention.

10 Mobile terminal device
11 Radio communication unit
12 Attracted unit
13 Radio communication unit
20 Stationary information device
21 Radio communication unit
22 Electromagnet unit
23 Radio communication unit

BEST MODE(S) FOR CARRYING OUT THE INVENTION

Exemplary embodiments of a stationary information device, a mobile terminal device, and a radio communication system according to the present invention will be explained in detail below with reference to the drawings. The present invention, however, is not limited to the exemplary embodiments.

EMBODIMENTS

FIG. 1 is a diagram for explaining the overview of a radio communication system according to the present invention. As depicted in FIG. 1, the radio communication system according to the present invention includes a mobile terminal device 10 that is detachable to be carried around, and a stationary information device 20 that performs information transmission for the mobile terminal device 10. The mobile terminal device 10 performs radio communications with the stationary information device 20 and obtains various pieces of information from the stationary information device 20.

The mobile terminal device 10 includes a radio communication unit 11, an attracted unit 12 that is attracted with an electromagnetic attraction force, and a radio communication unit 13. Moreover, the radio communication unit 11 and the radio communication unit 13 include antenna units 14 and 15, respectively, which transmit and receive radio waves at the time of having radio communications with the stationary information device 20.

The radio communication unit 11 performs radio communications with a radio communication unit 21 of the stationary information device 20, which will be described later, to detect how close the mobile terminal device 10 and the stationary information device 20 are positioned. Further, the radio communication unit 13 performs high-speed radio communications with a radio communication unit 23 of the stationary information device 20, which will be described later, to exchange information.

Here, the radio communication unit 11 and the radio communication unit 13 may be designed in such a manner as to operate with electrical power supplied from the power source (not shown) provided in the mobile terminal device 10, or may be designed to operate with electrical power from radio waves transmitted from the stationary information device 20. In addition, the radio communication unit 11 and the radio communication unit 13 are configured to consume very small transmission power for transmission and reception so that the mobile terminal device 10 can perform radio transmission to a device in its very close vicinity (in the range of less than tens of centimeters or several centimeters, for instance). With the configurations of the radio communication unit 11 and the radio communication unit 13 of the mobile terminal device 10, it barely interferes with other radio devices. Furthermore, improper operations are suppressed during activation of an electromagnet unit 22 as described later, realizing a system operation with high accuracy.

In addition, the radio communication unit 11 and the radio communication unit 13 of the mobile terminal device 10 may be each assigned, for instance, with a personal code number so that the code numbers can be used to distinguish a counterpart device that is a communication target and thereby communicate with the counterpart device. This prevents an improper operation from occurring. For the radio communication unit 11 as described above, a radio tag of a passive type is most suitable.

The attracted unit 12 is a portion that is attracted by the electromagnetic attraction force of the electromagnet unit 22 of the stationary information device 20, which will be described later. The attracted unit 12 is not particularly limited as long as it is attracted with an electromagnetic attraction force, and can be formed of a metallic material, for example.

Moreover, the stationary information device 20 includes the radio communication unit 21, the electromagnet unit 22, and the radio communication unit 23. The radio communication unit 21 and the radio communication unit 23 include antenna units 24 and 25, respectively, which perform transmission and reception of radio waves at the time of performing a radio communication with the mobile terminal device 10.

The radio communication unit 21 performs radio communications with the radio communication unit 11 of the mobile terminal device 10 to detect how close the mobile terminal device 10 and the stationary information device 20 are positioned. Further, the radio communication unit 23 performs high-speed radio communications with the radio communication unit 13 of the mobile terminal unit 10 to exchange information.

Here, the radio communication unit 21 and the radio communication unit 23 are designed in such a manner as to operate with electrical power supplied from the power source (not shown) provided in the stationary information device 20. In addition, the radio communication unit 21 and the radio communication unit 23 are configured to consume very small transmission power for transmission and reception so that the stationary information device 20 can perform radio transmission only to a device in its very close vicinity (in the range of less than tens of centimeters or several centimeters, for instance). With the configurations of the radio communication unit 21 and the radio communication unit 23 of the stationary information device 20, it barely interferes with other radio devices. Furthermore, improper operations are suppressed during activation of the electromagnet unit 22 as described later, realizing a system operation with high accuracy.

In addition, the radio communication unit 21 and the radio communication unit 23 of the stationary information device 20 may be each assigned, for instance, with a personal code number so that the code numbers can be used to distinguish a counterpart device that is a communication target and thereby communicate with the counterpart device. This prevents an improper operation from occurring.

The electromagnet unit 22 is formed, for example, with an iron core and a winding wire coil unit. The electromagnet unit 22 generates an electromagnetic attraction force 33 for fixing the mobile terminal device 10 and the stationary information device 20 to each other by attracting the attracted unit 12 of the mobile terminal device 10. The electromagnet unit 22 receives electrical power from the power source (not shown) of the stationary information device.

Figure 2:
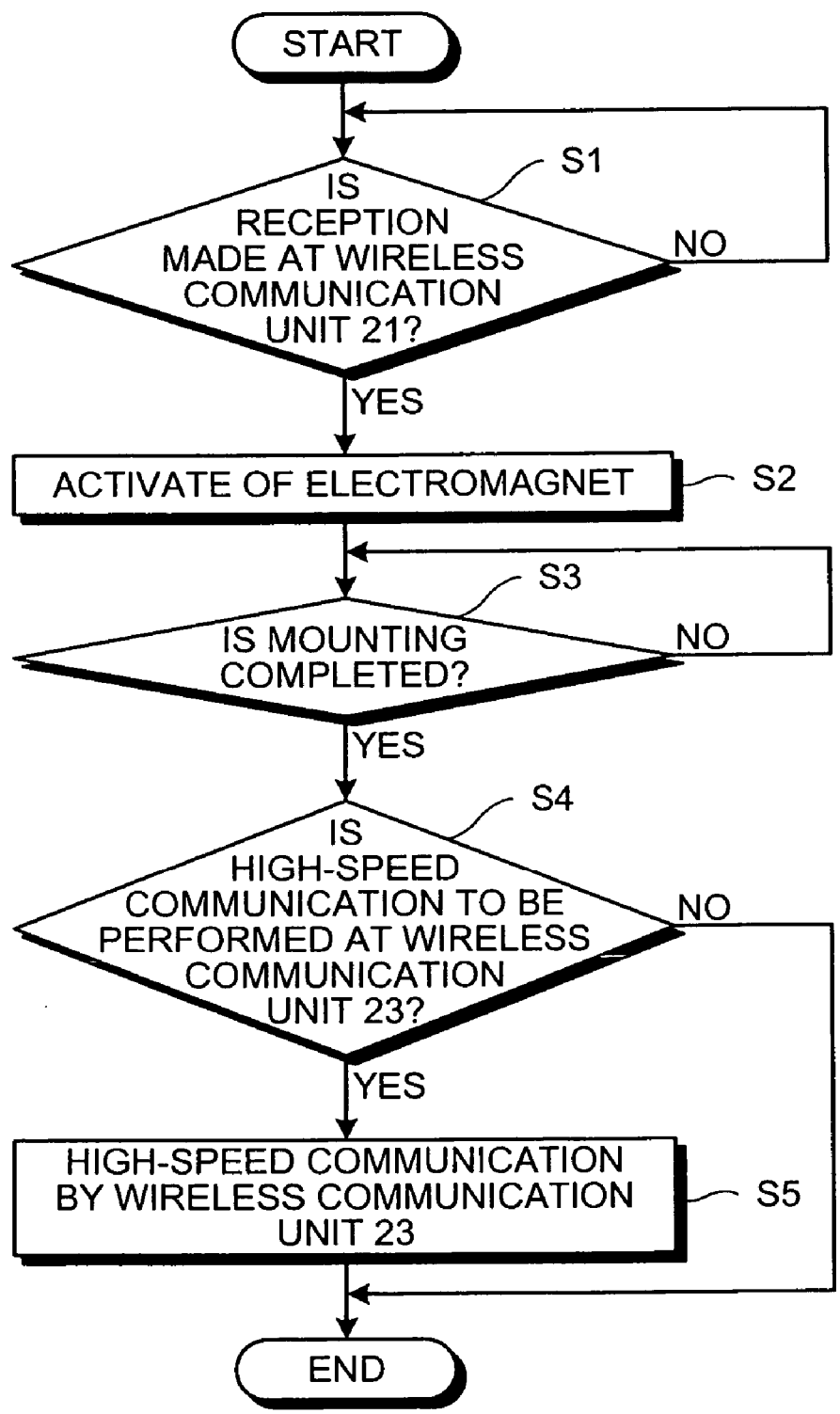
FIG. 2 is a flowchart for explaining the operation of the radio communication system.

Next, the operation of this radio communication system will be explained in detail with reference to FIGS. 1 and 2. FIG. 2 is a flowchart for explaining the operation of the radio communication system. First, the mobile terminal device 10 is brought into the close vicinity of the stationary information device 20. At this step, whether the radio communication unit 21 of the stationary information device 20 receives a radio signal transmitted from the radio communication unit 11 of the mobile terminal device 10 is determined (Step 1). When the radio communication unit 21 does not receive any radio signal transmitted from the radio communication unit 11 of the mobile terminal device 10 (Step 1, No), the radio communication unit 21 of the stationary information device 20 is unable to detect the mobile terminal device brought in its vicinity, and thus the radio communication unit 21 of the stationary information device 20 stands by until a new radio communication is received.

On the other hand, when the radio communication unit 21 of the stationary information device 20 receives a radio signal transmitted from the radio communication unit 11 of the mobile terminal device 10 (Step 1, Yes), the radio communication unit 21 of the stationary information device 20 detects the approach of the mobile terminal device. For approach detection, the radio communication unit 21 may be provided inside itself with a detecting unit 26, for example, that detects the approach of the mobile terminal device 10 based on the result of receiving a radio signal, and the detecting unit 26 performs detection using the signal level of the radio signal, a radio transmitted code, or the like. Furthermore, the detecting unit 26 may be arranged separately outside the radio communication unit 21.

It is preferable to adopt, for the radio communication unit 21 of the stationary information device 20, a unit with the detection distance to the mobile terminal device 10, i.e. the signal reception distance, being as short as possible. By using the radio communication unit 21 of the stationary information device 20 with a short reception distance, the receiver sensitivity of the radio communication unit 21 is lowered, which reduces the consumption power of the radio communication unit 21 and enhance power savings. Further, by shortening the detection distance, a unit with a high receiver sensitivity capable of performing reception in a long-distance range is not required. Because a low-priced radio communication unit with a relatively low receiver sensitivity can be adopted, cost reduction can be achieved.

Upon detection of the approach of the mobile terminal device 10, the radio communication unit 21 of the stationary information device 20 transmits an activation instruction 31 to the electromagnet unit 22. In response to the activation instruction 31, the electromagnet unit 22 activates the electromagnet (Step 2) to generate the electromagnetic attraction force 33. At this point, because the mobile terminal device 10 is positioned in the close vicinity of the stationary information device 20, the attracted unit 12 of the mobile terminal device 10 is attracted with the electromagnetic attraction force 33 that is generated by the electromagnet unit 22. This brings the mobile terminal device 10 to a state of being in contact with the stationary information device 20, and this electromagnet unit 22 secures the mobile terminal device 10 to the stationary information device 20 with the electromagnetic attraction force 33. In other words, according to the present invention, the mobile terminal device 10 and the stationary information device 20 are not fixed by a complex, mechanical fixing means, but with the electromagnetic attraction force 33 generated by the electromagnet unit 22. For mechanical fixation, complex fixing units, fixing members, and the like are required on both the mobile terminal device 10 and the stationary information device 20, which make the structures of the mobile terminal device 10 and the stationary information device 20 complex. In addition, because such fixing units and fixing members need to be produced, the design of the equipment becomes complicated, which is a drawback, increasing the manufacturing man-hour and the manufacturing cost. Furthermore, in the event of damage to a fixing member at the time of installing, it creates another drawback of more labor and time for repairing such a complex structure.

However, according to the present invention, the attracted unit 12 provided on the side of the mobile terminal device 10 and the electromagnet unit 22 provided on the side of the stationary information device 20 ensure the fixation of the mobile terminal device 10 to the stationary information device 20 with the electromagnetic attraction force 33 generated by the electromagnet unit 22. With this fixation method, a complex fixing unit or a fixing member is not required to be arranged on the mobile terminal device 10 and the stationary information device 20 so that the structures of the mobile terminal device 10 and the stationary information device 20 can be simplified and that the mobile terminal device 10 and the stationary information device 20 can be reliably fixed to each other. This lowers the manufacturing man-hour and the manufacturing cost of the mobile terminal device 10 and the stationary information device 20, realizing cost reduction. In addition, because no complex fixing member is incorporated, the possibility of damage or failure is minimized, allowing for a highly reliable system. Thus, with this fixation method, the mobile terminal device 10 and the stationary information device 20 can be reliably fixed to each other with a simple structure.

Moreover, according to the present invention, the fixation strength of the mobile terminal device 10 and the stationary information device 20 can be readily adjusted by adjusting the intensity of the electromagnetic attraction force 33 generated by the electromagnet unit 22. This allows the radio communication system to be used with the fixation strength of the mobile terminal device 10 and the stationary information device 20 being suitably adjusted in accordance with the environment in which the radio communication system is being used.

For instance, if it is used in the environment where vibration is generated such as in a vehicle, the mobile terminal device 10 and the stationary information device 20 are fixed with a relatively small fixation strength when the vehicle is stopped. In such a case, the intensity of the electromagnetic attraction force 33 generated by the electromagnet unit 22 is adjusted to be weakened. When the vehicle is on the move, because vibration is generated owing to the movement and the mobile terminal device 10 and the stationary information device 20 may come off due to the vibration, the mobile terminal device 10 and the stationary information device 20 are fixed with a larger fixation strength. In such a case, the intensity of the electromagnetic attraction force 33 generated by the electromagnet unit 22 is adjusted to be increased. As described above, the fixation strength of the mobile terminal device 10 and the stationary information device 20 can be readily adjusted by adjusting the intensity of the electromagnetic attraction force 33 generated by the electromagnet unit 22. The adjustment of the intensity of the electromagnetic attraction force 33 generated by the electromagnet unit 22 can be made by adjusting the power supply to the electromagnet unit 22. For instance, a personal code (a pin number determined by the user) may be input from the side of the mobile terminal device 10 for this purpose.

Under the current situation, a method of reliably detecting the coupling by the electromagnetic attraction force 33 of an electromagnet is unavailable. In other words, there is no method of reliably detecting the fixation of the mobile terminal device 10 and the stationary information device 20 with the electromagnetic attraction force 33 of the electromagnet unit 22. According to the present invention, the following verification process is therefore adopted as a method of detecting the fixation of the mobile terminal device 10 and the stationary information device 20 with the electromagnetic attraction force 33 of the electromagnet unit 22.

(1) After activating the electromagnet unit 22, a predetermined period of latency time is provided. Then, after the predetermined latency time elapses, the coupling by the electromagnetic attraction force 33 of the electromagnet unit 22, or the fixation of the mobile terminal device 10 and the stationary information device 20 is considered to be completed.

(2) After activating the electromagnet unit 22, a predetermined signal is transmitted from the radio communication unit 13 of the mobile terminal device 10, and the reception signal level is monitored at the time of the radio communication unit 23 of the stationary information device 20 receiving this signal. When the reception signal level of the signal received by the radio communication unit 23 of the stationary information device 20 is equal to or higher than a predetermined signal level, the coupling by the electromagnetic attraction force 33 of the electromagnet unit 22, or the fixation of the mobile terminal device 10 and the stationary information device 20 is considered to be completed.

(3) After the electromagnet unit 22 is activated and a predetermined period of time elapses, a predetermined signal is transmitted by the radio communication unit 21 of the stationary information device 20 while the transmission power of the radio communication unit 21 is lowered. The reception state is examined at the radio communication unit 11 of the mobile terminal device 10. Otherwise, after the electromagnet unit 22 is activated and a predetermined period of time elapses, a predetermined signal may be transmitted by the radio communication unit 23 of the stationary information device 20 while the transmission power of the radio communication unit 23 is lowered, and the reception state may be examined at the radio communication unit 13 of the mobile terminal device 10. Here, a data transmission signal may be used as a transmission signal, or a dummy signal special for this purpose may be used. Then, when the reception state of the signal at the radio communication unit 11 or the radio communication unit 13 of the mobile terminal device 10 is equal to or higher than a predetermined level of the reception state, the coupling by the electromagnetic attraction force 33 of the electromagnet unit 22, or the fixation of the mobile terminal device 10 and the stationary information device 20 is considered to be completed.

(4) After the processes (1) to (3) described above, a predetermined signal is transmitted from the radio communication unit 23 of the stationary information device 20 while the transmission power of the radio communication unit 23 is lowered, and the reception signal level or the reception state is examined at the radio communication unit 13 of the mobile terminal device 10. Otherwise, after the processes (1) to (3) described above, a predetermined signal may be transmitted from the radio communication unit 13 of the mobile terminal device 10 while the transmission power of the radio communication unit 13 is lowered, and the reception level or the reception state may be examined at the radio communication unit 23 of the stationary information device 20. Then, when the reception signal level at the radio communication unit 13 of the mobile terminal device 10 or the radio communication unit 23 of the stationary information device 20 is equal to or higher than a predetermined signal level, or the reception state of the signal is equal to or higher than a predetermined level of the reception state, the coupling by the electromagnetic attraction force 33 of the electromagnet unit 22, or the fixation of the mobile terminal device 10 and the stationary information device 20 is considered to be completed.

Whether the mounting of the mobile terminal device 10 on the stationary information device 20 is completed is thereby determined (Step 3). When the particular conditions are satisfied in the verification processes as described above, the fixation of the mobile terminal device 10 and the stationary information device 20, or the mounting of the mobile terminal device 10 onto the stationary information device 20, is determined as being completed (Step 3, Yes). Thereafter, the radio communication unit 11 of the mobile terminal device 10 and the radio communication unit 23 of the stationary information device 20 may stay in operation, or the operation may be stopped after the completion of the fixation of the mobile terminal device 10 and the stationary information device 20 is determined. A fixation determining unit 27 that determines the completion of the mounting of the mobile terminal device 10 onto the stationary information device 20, i.e. the completion of the attraction and fixation of the mobile terminal device 10 and the stationary information device 20 can be arranged, for example, in the radio communication unit 21 to provide a structure in which the determination is made at the fixation determining unit 27. It is certainly possible to arrange the fixation determining unit 27 separately outside the radio communication unit 21.

On the other hand, when the particular conditions are not satisfied in the verification processes as described above, the fixation of the mobile terminal device 10 and the stationary information device 20, i.e. the mounting of the mobile terminal device 10 onto the stationary information device 20, is determined as incomplete (Step 3, No), and the verification processes for mounting are repeated. The completion of the mounting of the mobile terminal device 10 onto the stationary information device 20 can be readily checked by arranging a displaying unit or the like that indicates whether it is mounted, in either the mobile terminal device 10 or the stationary information device 20 and controlling it to display.

Once the completion of the mobile terminal device 10 being mounted onto the stationary information device 20 is verified through the above verification processes, the radio communication unit 21 of the stationary information device 20 determines whether high-speed radio communications should be performed at the radio communication unit 23 (Step 4). For the determination as to whether the high-speed radio communications are performed, for example, the user may input into the stationary information device 20 information as to whether standard communications or high-speed radio communications are to be performed, and the determination may be made based on this information. If the high-speed radio communications are determined not to be performed according to the user's information (Step 4, No), the communications are performed at a standard speed. Moreover, if the high-speed radio communications are determined to be performed according to the user's information (Step 4, Yes), the radio communication unit 21 of the stationary information device 20 transmits an instruction signal 32 of executing high-speed communications to the radio communication unit 23. Upon receipt of this instruction, the radio communication unit 23 performs high-speed communications with the radio communication unit 11 of the mobile terminal device 10 (Step 5).

Here, the mobile terminal device 10 and the stationary information device 20 are fixed in a manner as described above, which brings the distance between the mobile terminal device 10 and the stationary information device 20 to 0. This means, in theory, that the arrangement is made in such a manner as to make the distance between the radio communication unit 13 of the mobile terminal device 10 and the radio communication unit 23 of the stationary information device 20 the shortest. Thus, the transmission power required for radio transmission between the mobile terminal device 10 and the stationary information device 20 is remarkably small power, theoretically the smallest power to perform radio transmission between the mobile terminal device 10 and the stationary information device 20. It should be noted, however, that this transmission power may vary to some degree depending on conditions such as the distance between the radio communication unit of the mobile terminal device 10 and the radio communication unit of the stationary information device 20.

Hence, according to the present invention, radio transmission can be conducted between the mobile terminal device 10 and the stationary information device 20 with a remarkably small transmission power by fixing the mobile terminal device 10 and the stationary information device 20 to each other with the electromagnetic attraction force 33 of the electromagnet unit 22, as described above.

Here, when performing radio transmission between the mobile terminal device 10 and the stationary information device 20, a broader channel (bandwidth) is required for radio transmission to perform radio transmission at higher speed.

Generally in the radio field, however, a channel (bandwidth) allowed for a user is restricted to a specific level by the Radio Law, prohibiting a user from using a bandwidth beyond a specified value so that multiple users are able to use it at the same time. In other words, the transmission power available for a user is stipulated in a certain range. The use of transmission power beyond this stipulated range is considered as interference of other users' radio transmission.

Thus, the present invention is featured in performing radio transmission with an available bandwidth expanded within the aforementioned range of stipulated values by setting the transmission power to a significantly low value. In other words, by setting the transmission power consumed for a unit bandwidth to a significantly low value, the total transmission power in use stays within the aforementioned range of the stipulated values even when the available bandwidth is expanded.

Figure 3:
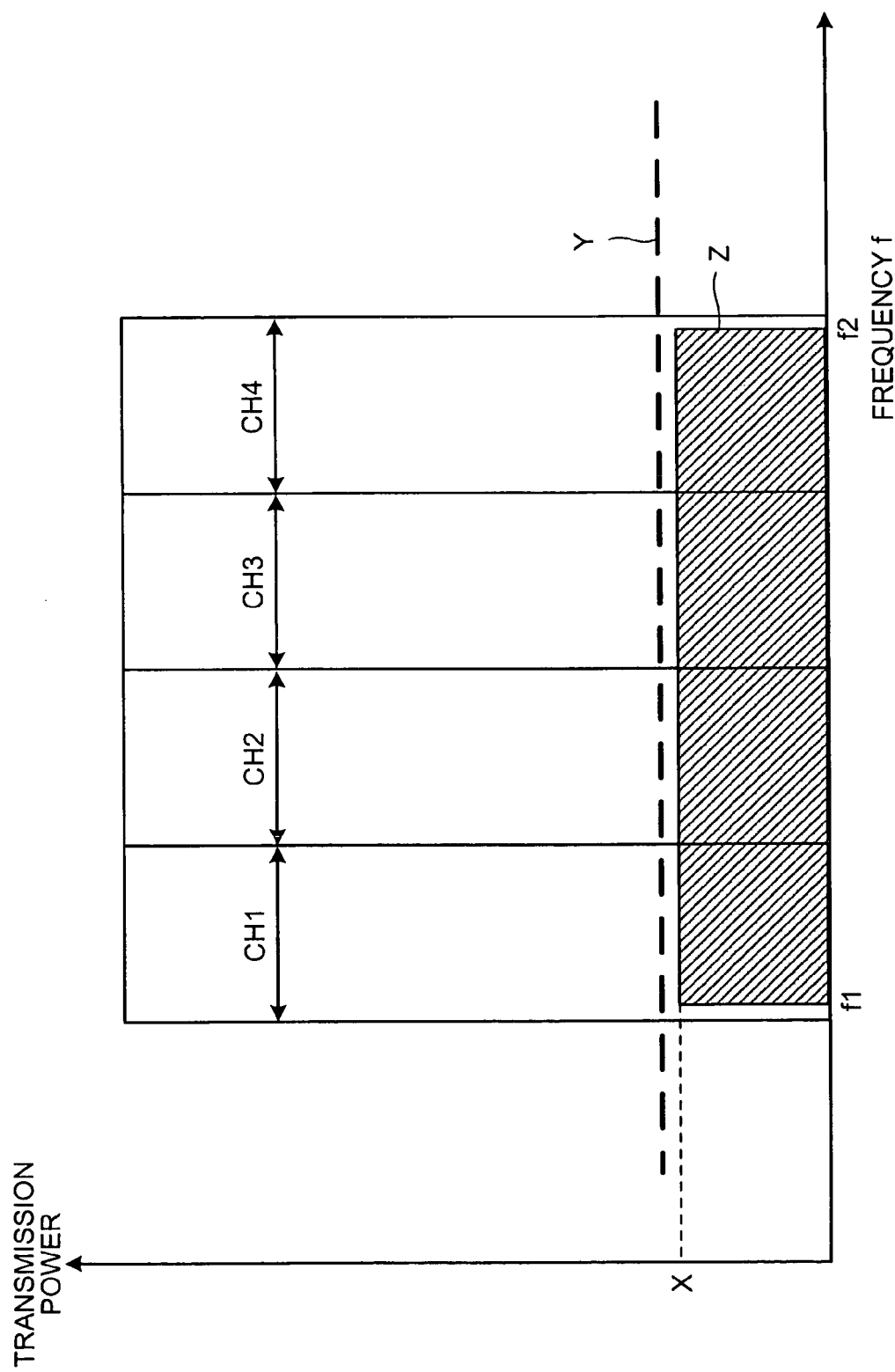
FIG. 3 is a diagram for explaining the relationship between radio bands and transmission power.

In addition, according to the present invention, when the fixation of the mobile terminal device 10 and the stationary information device 20 by the electromagnetic attraction force 33 of the electromagnet unit 22 in the aforementioned verification processes is considered as being completed, the radio communication unit 21 sends the radio communication unit 23 the instruction signal 32 which instructs it to start radio transmission through multiple channels by extending the radio bandwidth used between the radio communication unit of the mobile terminal device 10 and the radio communication unit of the stationary information device 20. Upon receipt of this instruction, the radio communication unit of the stationary information device 20 extends the radio bandwidth as indicated in FIG. 3 and starts radio transmission, i.e. high-speed radio communications through multiple channels. FIG. 3 indicates use of multiple channels, Channel 1 to Channel 4, in a certain frequency band by using the transmission power X per unit bandwidth (channel) and extending the radio band. Further, the broken line Y in FIG. 3 is a line indicating a stipulation value stipulated by the Radio Law, for example. In FIG. 3, radio transmission is performed with a transmission power X in a range Z of frequencies f1 to f2 in the shaded portion.

Moreover, according to the present invention, a communication method using the entire channel such as a spread spectrum method may be adopted other than the aforementioned method of using multiple channels in parallel that are identical to a channel of the transmission and reception method utilizing a unit bandwidth (channel).

According to the present invention, it should be noted that standard radio communications, i.e. radio transmission, which uses a single channel can be performed other than high-speed communications using multiple channels. In such a case, because a transmission power for a unit bandwidth (channel) is set to a significantly low value, power saving can be achieved in standard-speed communications.

According to the present invention, the transmission power can be set to a power the least required for radio transmission between the mobile terminal device 10 and the stationary information device 20 by fixing the mobile terminal device 10 and the stationary information device 20 to each other by the electromagnetic attraction force 33 of the electromagnet unit 22, as described above. Radio transmission can thereby be performed in an expanded, large bandwidth while complying with the restriction stipulated by the Radio Law and causing no interference with radio transmission of other radio users. By performing radio transmission in the expanded, large bandwidth in such a manner, the radio transmission can be realized at higher speed.

In the above description, the radio communication unit 21 may be set to a transmission power smaller than a predetermined value to perform radio communications with, with a radio bandwidth expanded in advance.

When communications are completed and the mobile terminal device 10 is to be detached from the stationary information device 20, the magnetism of the electromagnet unit 22 is erased by stopping the power supply to the electromagnet unit 22. With the fixation strength eliminated between the mobile terminal device 10 and the stationary information device 20, the mobile terminal device 10 can be detached from the stationary information device 20. Further, the mobile terminal device 10 may be detached from the stationary information device 20 by gradually reducing the power supply to the electromagnet unit 22 with time to gradually weaken the electromagnetic attraction force 33 of the electromagnet unit 22 of the stationary information device 20, thereby weakening the fixation strength between the mobile terminal device 10 and the stationary information device 20. In addition, the mobile terminal device 10 may be detached from the stationary information device 20 by passing a current of a reversed phase to weaken the fixation strength between the mobile terminal device 10 and the stationary information device 20. Still further, the mobile terminal device 10 may be detached from the stationary information device 20 by inputting a personal code from the side of the mobile terminal device 10 to reduce the electromagnetic attraction force 33 of the electromagnet unit 22 of the stationary information device 20 and thereby weaken the fixation strength between the mobile terminal device 10 and the stationary information device 20.

As explained above, according to the present invention, the mobile terminal device 10 and the stationary information device 20 are fixed to each other with the electromagnetic attraction force 33 of the electromagnet unit 22 after detecting the approach of the mobile terminal device 10 and the stationary information device 20. This ensures the fixation of the mobile terminal device 10 and the stationary information device 20, while simplifying the structures of the mobile terminal device 10 and the stationary information device 20. Furthermore, the present invention performs communications with a transmission power smaller than a predetermined level in a communication bandwidth expanded between the mobile terminal device 10 and the stationary information device 20. This allows for high-speed radio communications in an expanded, large bandwidth without causing interference with radio transmission of other radio users.

In the above description, a structure in which an attracted unit (metal unit) is arranged on the side of the mobile terminal device 10 and the electromagnet unit 22 is arranged on the side of the stationary information device 20 was explained. The present invention is not limited to this configuration, however. For instance, a structure in which an attracted unit (metal unit) and the electromagnet unit 22 are provided on each of the mobile terminal device 10 and the stationary information device 20 may be adopted. Otherwise, a structure in which the electromagnet unit 22 is provided on each of the mobile terminal device 10 and the stationary information device 20 so that the electromagnets are fixed to each other may be adopted.

EMBODIMENT

An embodiment which offers the aforementioned advantages will be explained below, using as an example a case where an electronic-book-type mobile terminal device is adopted. The present invention, however, should not be limited thereto, and is applicable for various devices as long as it is as a mobile information terminal device that can perform radio transmission.

Figure 4:
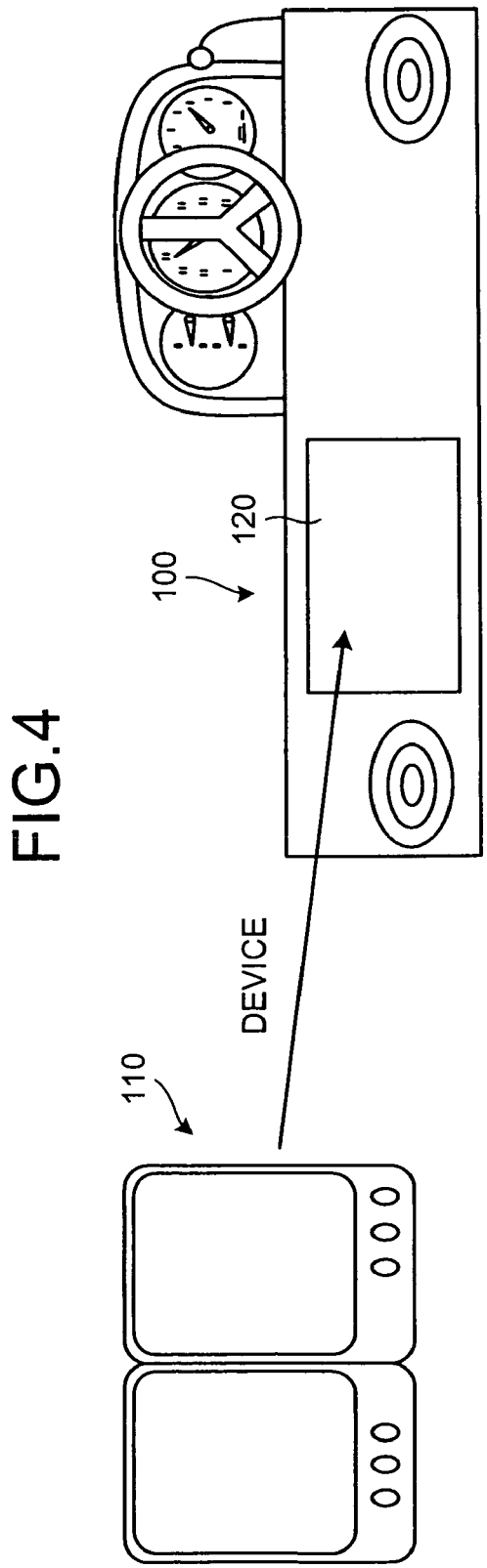
FIG. 4 is a diagram for explaining the overview of the radio communication system of the present invention that is applied to an in-vehicle system.

According to the present embodiment, a radio communication system that performs high-speed radio communications with an electronic-book-type mobile terminal device 110 fixed to a stationary information device 120 that is arranged on the dashboard of a vehicle will be explained, as illustrated in FIG. 4. For the present embodiment, the above explanation should be referred to regarding units similar to the ones that have been explained in the above modes of the invention, and thus detailed description will be omitted.

Figure 5:
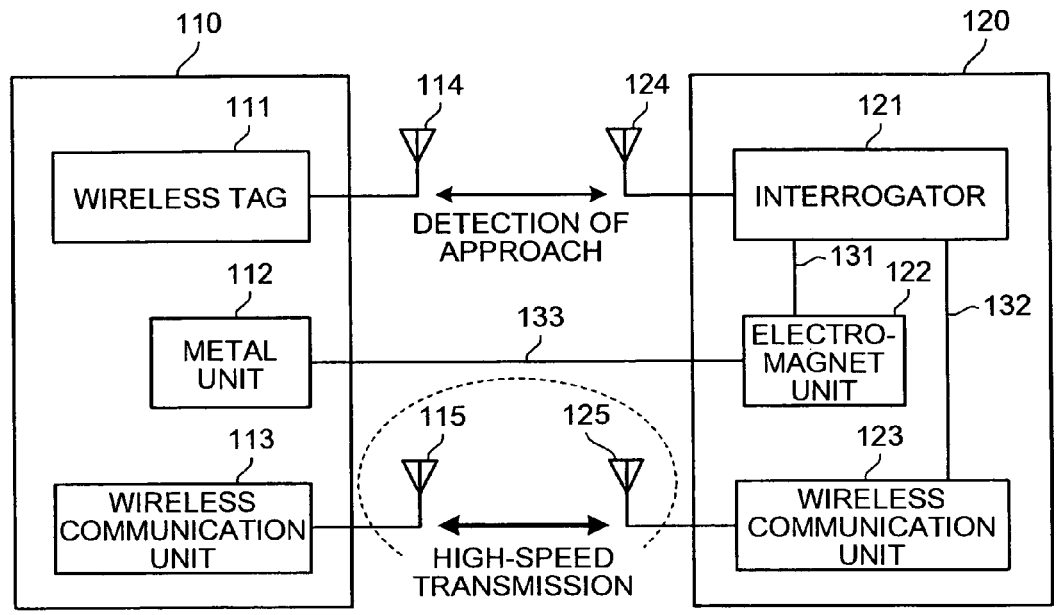
FIG. 5 is a diagram for explaining the overview of a radio communication system according to an embodiment of the present invention.

FIG. 5 is a diagram for explaining the overview of the radio communication system according to the present embodiment. As illustrated in FIG. 5, the radio communication system according to the present embodiment includes the electronic-book-type mobile terminal device 110 that is detachable and portable, and the stationary information device 120 that transmits information to the electronic-book-type mobile terminal device 110. The electronic-book-type mobile terminal device 110 performs radio communications with the stationary information device 120 and obtains various information from the stationary information device 120.

The electronic-book-type mobile terminal device 110 includes a radio tag 111, a metal unit 112, and a radio communication unit 113. Further, the radio tag 111 and the radio communication unit 113 include antennas 114 and 115, respectively, which perform transmission and reception of radio waves in radio communications with the stationary information device 120.

The radio tag 111 is designed to detect the approach of the electronic-book-type mobile terminal device 110 and the stationary information device 120 by performing radio communications with an interrogator 121 of the stationary information device 120, which will be discussed later. In addition, the radio communication unit 113 performs high-speed radio communications with a radio communication unit 123 of the stationary information unit 120, which will be discussed later, to exchange information.

The metal unit 112 corresponds to the attracted unit 12, and is a unit that is to be attracted by an electromagnetic attraction force of an electromagnet unit 122 of the stationary information device 120, which will be discussed later.

The stationary information device 120 includes the interrogator 121, the electromagnet unit 122, and the radio communication unit 123. The interrogator 121 and the radio communication unit 123 include antennas 124 and 125, respectively, which perform transmission and reception of radio waves in radio communications with the book-type mobile terminal device 110.

The interrogator 121 is an RFID reader/writer, which corresponds to the aforementioned radio communication unit 21. In other words, it performs radio communications with the radio tag 111 of the book-type mobile terminal device 110 to detect the approach of the book-type mobile terminal device 110 and the stationary information device 120. Further, the radio communication unit 123 performs high-speed radio communications with the radio communication unit 113 of the book-type mobile terminal device 110 to exchange information.

The interrogator 121 and the radio communication unit 123 are designed in such a manner as to operate with electrical power supplied from the power source (not shown) provided in the stationary information device 120. Moreover, the interrogator 121 and the radio communication unit 123 are configured to have very small transmission power for transmission and reception so that the stationary information device 120 can perform radio transmission to a device in its very close vicinity (in the range of less than several tens of centimeters or several centimeters, for instance). With the configurations of the interrogator 121 and the radio communication unit 123 of the stationary information device 120, it barely interferes with other radio devices. Furthermore, improper operations are suppressed at the time of activating the electromagnet unit 122 as described later, allowing for a system operation with high accuracy.

In addition, the interrogator 121 and the radio communication unit 123 of the stationary information device 120 may be each assigned with a personal code number, for instance, so that the code numbers can be used to distinguish a counterpart device that is a communication target and to communicate with the counterpart device. This prevents an improper operation from occurring.

The electromagnet unit 122 corresponds to the electromagnet unit 22 and generates an electromagnetic attraction force 133 to attract the metal unit 112 of the book-type mobile terminal device 110 and thereby fix the book-type mobile terminal device 110 and the stationary information device 120. The electromagnet unit 122 operates with electric power supplied from the power source (not shown) of the stationary information device.

Figure 6:
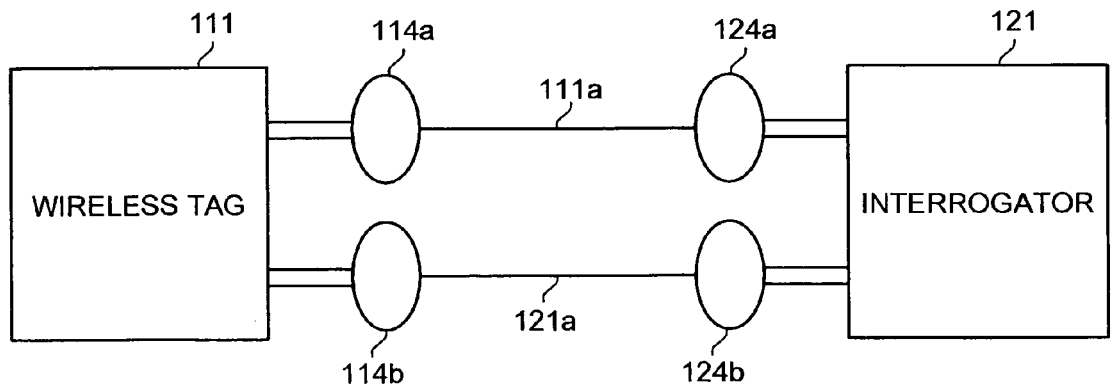
FIG. 6 is a diagram for explaining communications between a radio tag and an interrogator.

Next, the operation of this radio communication system will be explained. First, the detection of the approach of the book-type mobile terminal device 110 by use of the radio tag will be explained. As illustrated in FIG. 6, the antenna 124b of the interrogator 121, which functions as a reader/writer, transmits to the antenna 114b of the radio tag 111 power to be used in the electronic circuit of the radio tag 111, to the radio tag 111 via a carrier wave 121a. The antenna 114a of the radio tag 111 transmits a radio wave 111a modulated in the radio tag 111 to the interrogator 121, which is received by the antenna 124a of the interrogator 121. The approach of the book-type mobile terminal device 110 can be thereby detected in accordance with the signal level, code or the like of the received radio wave. In other words, the interrogator 121 is provided with a function of the above detecting unit. The use of two antennas for communications and for power supply is explained here, but they may be replaced with a single antenna.

Figure 7:
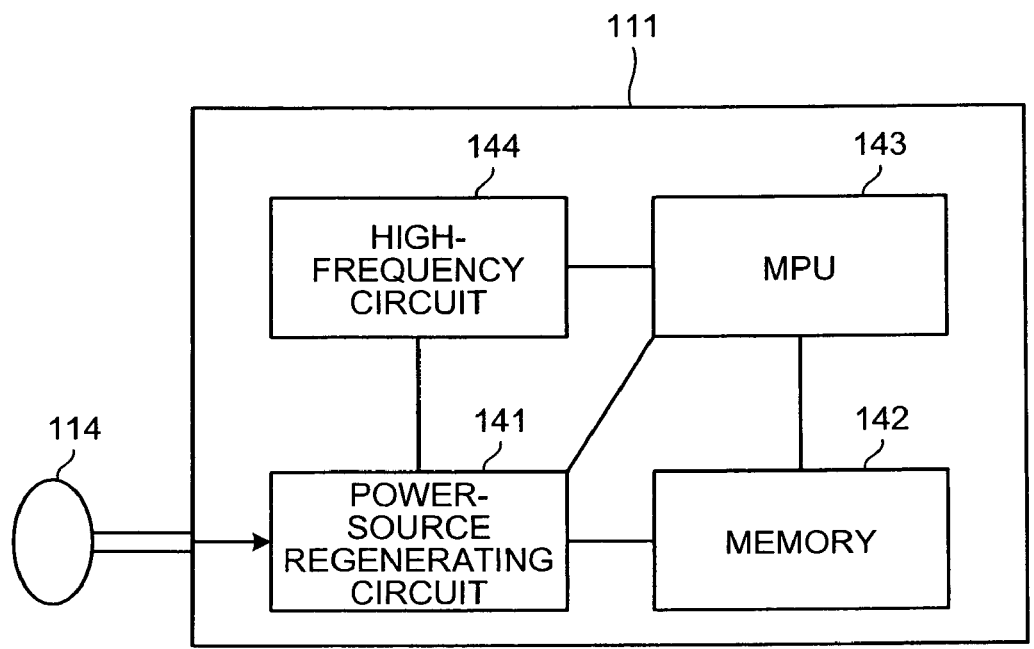
FIG. 7 is a schematic block diagram for explaining the structure of the radio tag.

Next, the radio tag 111 will be explained with reference to FIG. 7. The radio tag 111 is not equipped with a power supply for operation. It receives with the antenna 114 the carrier wave 121a sent from the interrogator 121 as described above, rectifies part of the wave at a power-source regenerating circuit 141, and regenerates a power source that is necessary for operation. This process is controlled by an MPU 143. Further, the radio tag 111 is not equipped with a local oscillator for a carrier wave, or the like. Thus, the radio tag 111 modulates the carrier wave 121a sent from the interrogator 121 at a high-frequency circuit 144 of the radio tag 111 by use of the information written in a memory 142, and sends the signal out to transmit specific information to the interrogator 121.

When the book-type mobile terminal device 110 approaches, the interrogator 121 detects the approach of the book-type mobile terminal device 110 and sends an activation instruction 131 to the electromagnet unit 122. Upon receipt of the activation instruction 131, the electromagnet unit 122 activates the electromagnet and generates an electromagnetic attraction force 133. Then, because the book-type mobile terminal device 110 is positioned in the close vicinity of the stationary information device 120 at this point, the metal unit 112 of the book-type mobile terminal device 110 is attracted with the electromagnetic attraction force 133 generated by the electromagnet unit 122. This brings the book-type mobile terminal device 110 to a state of being in contact with the stationary information device 120, and moreover, the book-type mobile terminal device 110 and the stationary information device 120 are fixed to each other with the electromagnetic attraction force 133 of the electromagnet unit 122. In other words, in this radio communication system, the book-type mobile terminal device 110 and the stationary information device 120 are not fixed by a complex, mechanical fixing means, but with the electromagnetic attraction force 133 generated by the electromagnet unit 122. This eliminates the need for arranging complex fixing units or fixing members on the book-type mobile terminal device 110 and the stationary information device 120, simplifies the structures of the book-type mobile terminal device 110 and the stationary information device 120, and ensures the fixation of the book-type mobile terminal device 110 and the stationary information device 120.

Furthermore, in the present embodiment also, the fixation strength of the book-type mobile terminal device 110 and the stationary information device 120 can be readily adjusted by adjusting the intensity of the electromagnetic attraction force 133 generated by the electromagnet unit 122.

For instance, when used as an in-vehicle system as in the present embodiment, the fixation strength of the book-type mobile terminal device 110 and the stationary information device 120 with the electromagnetic attraction force 133 can be increased by detecting the vehicle speed with reference to the vehicle speed pulse or the GPS information and increasing the power supply to the electromagnet unit 122 in accordance with the vehicle speed. The book-type mobile terminal device 110 and the stationary information device 120 can thereby be securely fixed to each other even under a condition where the vehicle moves at a high speed and vibration increases, realizing a system excellent in safety. Furthermore, the fixation strength of the book-type mobile terminal device 110 and the stationary information device 120 may be adjusted by receiving the information on the surrounding environment other than the vehicle speed, such as the vehicle acceleration and using the environmental information.

In addition, when used as an in-vehicle system as in the present embodiment, a situation where the user temporarily leaves the vehicle with the power of each device on may happen. In such a case, if the fixation strength of the book-type mobile terminal device 110 and the stationary information device 120 is weak, the book-type mobile terminal device 110 could be detached and stolen. In the present embodiment, when the user temporarily leaves the vehicle, the electromagnetic attraction force 133 of the electromagnet unit 122 is increased to enhance the fixation strength of the book-type mobile terminal device 110 and the stationary information device 120, by inputting a specific code through the book-type mobile terminal device 110 so that the book-type mobile terminal device 110 can be protected against theft. Then, when the user returns to the vehicle, the fixation strength of the book-type mobile terminal device 110 and the stationary information device 120 can be set back to the normal level by inputting a specific code through the book-type mobile terminal device 110.

In addition, a configuration is feasible in such that another radio device carried by the user can perform radio communications with the stationary information device 120 so that the user leaving the vehicle can be detected. The fixation strength of the book-type mobile terminal device 110 and the stationary information device 120 can thereby be increased to protect the book-type mobile terminal device 110 against theft. Then, when the user returns to the vehicle, the mobile device carried by the user performs radio communications with the stationary information device 120 to detect the return of the user to the vehicle so that the fixation strength of the book-type mobile terminal device 110 and the stationary information device 120 can be set back to the normal level.

Then, when the completion of fixation of the book-type mobile terminal device 110 to the stationary information device 120 is verified in a similar manner to the aforementioned mode of the invention, the interrogator 121 sends an instruction signal 132 to the radio communication unit 123 to execute high-speed radio communications. Although the interrogator 121 that is provided with a function of the aforementioned fixation determining unit is explained here, the fixation determining unit may be arranged separately outside the interrogator 121. Upon receipt of this instruction, the radio communication unit 123 performs high-speed radio communications with the radio communication unit 113 of the book-type mobile terminal device 110. The high-speed radio communications are performed with a communication band expanded between the book-type mobile terminal device 110 and the stationary information device 120 in a similar manner to the aforementioned mode of the invention so that the communications can be performed with a transmission power lower than a predetermined level. This allows for high-speed radio communications with an expanded, large bandwidth, without interfering with radio transmission of other radio users.

Figure 8:
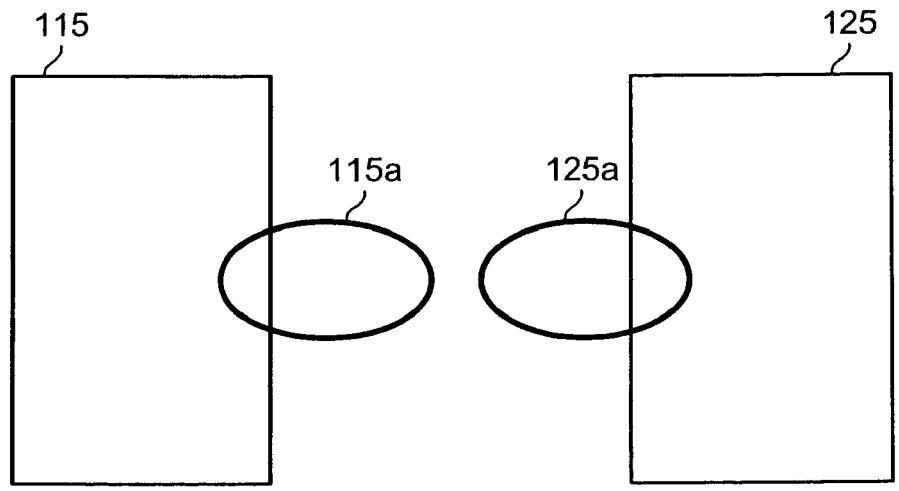
FIG. 8 is a diagram for explaining directional antennas.

Moreover, it is preferable to adopt directional antennas for the antenna 115 and the antenna 125 and install them in such a manner that the antenna directivity is set in the antenna direction of each other, as illustrated in FIG. 8. With the directional antennas, the device itself is protected against interference from outside, and avoids interference with other devices. In addition, their capability of performing radio transmission stably even with a transmission power set low makes them more preferable.

In the radio communication system according to the present embodiment configured as described above, the approach of the book-type mobile terminal device 110 and the approach of the stationary information device 120 are detected by use of the radio tag 111 and the interrogator 121, respectively, to fix the book-type mobile terminal device 110 and the stationary information device 120 to each other with the electromagnetic attraction force 133 of the electromagnet unit 122. This allows for reliable fixation of the book-type mobile terminal device 110 and the stationary information device 120, while the structures of the book-type mobile terminal device 110 and the stationary information device 120 are designed to be simple. Then, communications are performed with a transmission power lower than a predetermined level by expanding the communication band between the book-type mobile terminal device 110 and the stationary information device 120. As a result, high-speed radio communications can be performed with an expanded, large bandwidth, without interfering with radio transmission of other radio users.

It should be noted that, as a modification of the present invention, the structure may be such that, for example, multiple radio tags 152, interrogators 153, electromagnet units 154, and metal units 155 are arranged for mounting of a book-type mobile terminal device 150 onto a stationary information device 151, as illustrated in FIG. 9. The structure in FIG. 9 incorporates each unit in pairs. Such a structure allows for mounting of the book-type mobile terminal device 150 by detecting the top and bottom sides or left and right sides of the book-type mobile terminal device 150, and prevents failure from occurring, such as the device from being mounted upside down. Furthermore, when detaching the book-type mobile terminal device 150, the detachment can be facilitated by switching off the electromagnet unit 154 on the bottom side of the book-type mobile terminal device 150 first.

In addition, the use of the book-type mobile terminal device as a mobile terminal device was explained in the above description. The present invention should not be limited thereto, however, and various modes of radio communication devices such as a PDA, a cellular phone, and a card-type audio-visual device may be adopted.

The invention claimed is:

1. A radio communication system that performs a radio communication between a stationary information device and a mobile terminal device, wherein
   the stationary information device includes
      a first radio communication unit that performs a radio communication to detect an approach between the stationary information device and the mobile terminal device, the first radio communication unit including a detecting unit that detects the approach between the stationary information device and the mobile terminal device based on a result of the radio communication by the first radio communication unit; and
      an attracting unit that generates, when the detecting unit detects the approach between the stationary information device and the mobile terminal device, an attraction force for attracting and fixing the mobile terminal device, and
   the mobile terminal device includes
      a second radio communication unit that performs the radio communication with the first radio communication unit of the stationary information device; and
      an attracted unit that is attracted to the attraction force generated by the stationary information device.

2. The radio communication system according to claim 1, wherein
   the attraction force is an electromagnetic attraction force.

3. The radio communication system according to claim 1, wherein
   the stationary information device further includes a third radio communication unit that performs a radio communication with the mobile terminal device by using a frequency band more expanded than a unit frequency band, in a state in which a transmission power per unit frequency band is set to be lower than a predetermined value, and
   the mobile terminal device further includes a fourth radio communication unit that performs a radio communication with the third radio communication unit of the stationary information device.

4. The radio communication system according to claim 1, wherein
   the first radio communication unit further includes a fixation determining unit that determines a completion of attracting and fixing the mobile terminal device with the attraction force.

5. The radio communication system according to claim 1, wherein
   the first radio communication unit is a radio-frequency-identification reader/writer, and
   the second radio communication unit is a radio tag.

6. The radio communication system according to claim 1, further comprising:
   an intensity adjusting unit that adjusts an intensity of the attraction force.

7. A stationary information device comprising:
   a first radio communication unit that performs a radio communication to detect approach between the stationary information device and an external device, the first radio communication unit including a detecting unit that detects the approach between the stationary information device and the external device based on a result of the radio communication by the first radio communication unit; and
   an attracting unit that generates, when the detecting unit detects the approach between the stationary information device and the external device, an attraction force for attracting and fixing the external device,
   wherein the external device includes a second radio communication unit, and a third radio communication unit of the stationary information device performs the radio communication with the second radio communication unit when the external device is attracted and fixed to the stationary information device.

8. The stationary information device according to claim 7, wherein
   the attraction force is an electromagnetic attraction force.

9. A stationary information device comprising:
   a first radio communication unit that performs a radio communication to detect approach of an external device, the first radio communication unit including a detecting unit that detects the approach of the external device based on a result of the radio communication by the first radio communication unit;
   an attracting unit that generates, when the detecting unit detects the approach of the external device, an attraction force for attracting and fixing the external device; and
   a second radio communication unit that performs a radio communication with the external device by using a frequency band more expanded than a unit frequency band, in a state in which a transmission power per unit frequency band is set to be lower than a predetermined value.

10. The stationary information device according to claim 7, wherein
   the first radio communication unit further includes a fixation determining unit that determines a completion of attracting and fixing the external device with the attraction force.

11. The stationary information device according to claim 7, wherein
   the first radio communication unit is a radio-frequency-identification reader/writer.

12. The stationary information device according to claim 7, further comprising:
   an intensity adjusting unit that adjusts an intensity of the attraction force.

13. A mobile terminal device comprising:
   a first radio communication unit that performs a radio communication with a second radio communication unit of an external device that has initiated the radio communication to detect an approach between the mobile terminal device and the external device; and an attracted unit that is attracted to an attraction force generated by the external device when the approach has been detected, wherein a third radio communication unit of the external device performs the radio communication with the mobile terminal device when the mobile terminal device is attracted and fixed to the external device.

14. The mobile terminal device according to claim 13, wherein the second radio communication unit performs a radio communication with the external device by using a frequency band more expanded than a unit frequency band, in a state in which a transmission power per unit frequency band is set to be lower than a predetermined value.

15. The mobile terminal device according to claim 13, wherein the first radio communication unit is a radio tag.

* * * * *